(12) United States Patent
Wendeler-Goeggelmann

(10) Patent No.: US 10,058,909 B2
(45) Date of Patent: Aug. 28, 2018

(54) WIRE NETTING AND METHOD FOR PRODUCING A HELIX FOR A WIRE NETTING

(71) Applicant: Geobrugg AG, Romanshorn (CH)

(72) Inventor: Corinna Wendeler-Goeggelmann, Herisau (CH)

(73) Assignee: Geobrugg AG, Romanshorn (CH)

( * ) Notice: Subject to any disclaimer, the term of this patent is extended or adjusted under 35 U.S.C. 154(b) by 0 days.

(21) Appl. No.: 15/876,257

(22) Filed: Jan. 22, 2018

(65) Prior Publication Data

US 2018/0214929 A1 Aug. 2, 2018

(30) Foreign Application Priority Data

Jan. 30, 2017 (DE) .................. 10 2017 101 754

(51) Int. Cl.
| | | |
|---|---|---|
| *B21F 27/02* | (2006.01) | |
| *B21F 27/00* | (2006.01) | |
| *B21F 27/14* | (2006.01) | |
| *A01K 75/00* | (2006.01) | |
| *E02B 3/12* | (2006.01) | |
| *E01F 7/04* | (2006.01) | |

(52) U.S. Cl.
CPC ............ *B21F 27/005* (2013.01); *B21F 27/02* (2013.01); *B21F 27/14* (2013.01); *A01K 75/00* (2013.01); *E01F 7/045* (2013.01); *E02B 3/124* (2013.01)

(58) Field of Classification Search
CPC ........ B21F 27/02; B21F 27/005; B21F 31/00; B21F 15/04; E01F 7/04; E01F 13/028; E01F 7/045; E04G 21/3261; E04G 21/28; E02B 3/124; E02D 17/20; E02D 29/0208
USPC ...... 245/5, 8, 2, 7, 1, 11, 3, 9, 6; 405/302.7, 405/27, 63, 72; 140/7, 102, 111, 92.3
See application file for complete search history.

(56) References Cited

U.S. PATENT DOCUMENTS

| | | |
|---|---|---|
| 2,954,180 A | 9/1960 | Crum |
| 3,570,291 A | 3/1971 | Shiguma |
| 4,491,003 A | 1/1985 | Messick et al. |
| 4,513,793 A | 4/1985 | Rohrbacher |

(Continued)

FOREIGN PATENT DOCUMENTS

| | | |
|---|---|---|
| CA | 2 752 023 A1 | 4/2012 |
| CH | 703 929 A2 | 4/2012 |

(Continued)

OTHER PUBLICATIONS

Office Action dated Feb. 23, 2018 issued in corresponding AU patent application No. 2018200124.

(Continued)

*Primary Examiner* — Bobby Muromoto, Jr.
(74) *Attorney, Agent, or Firm* — Posz Law Group, PLC

(57) ABSTRACT

A wire netting, in particular a safety net, with a plurality of helices which are braided with each other, of which at least one helix is bent from at least one single wire, a wire bundle, a wire strand, a wire rope and/or another longitudinal element with at least one wire, in particular comprises a high-tensile steel, the at least one helix having at least one first leg, at least one second leg as well as at least one bending region connecting the first leg and the second leg to each other, wherein
the longitudinal element is bent at least substantially torsion-free in itself along a contour of the first leg and/or of the second leg.

15 Claims, 9 Drawing Sheets

(56) References Cited

U.S. PATENT DOCUMENTS

| | | | | |
|---|---|---|---|---|
| 4,982,813 A * | 1/1991 | Starr | A62B 1/22 | 182/138 |
| 4,986,389 A * | 1/1991 | Halligan, Sr. | E04G 21/28 | 182/138 |
| 5,582,266 A * | 12/1996 | Rexroad | A62B 1/22 | 182/138 |
| 5,996,972 A * | 12/1999 | Kaiser | E01F 7/045 | 245/5 |
| 6,279,858 B1 | 8/2001 | Eicher | | |
| 7,108,233 B2 * | 9/2006 | Giuseppin | B21F 15/04 | 140/88 |
| 7,325,774 B2 * | 2/2008 | Jun | B21F 27/02 | 245/11 |
| 7,975,594 B2 * | 7/2011 | Wartmann | F41H 5/013 | 428/911 |
| 8,070,107 B2 * | 12/2011 | Chen | E04H 17/066 | 245/1 |
| 8,678,709 B2 * | 3/2014 | Utz | E01F 7/04 | 256/12.5 |
| 2006/0144640 A1 * | 7/2006 | Wartmann | B21F 31/00 | 182/138 |
| 2007/0131917 A1 * | 6/2007 | Wartmann | B21F 27/02 | 256/12.5 |
| 2007/0210214 A1 * | 9/2007 | Wartmann | B21F 27/02 | 245/5 |
| 2008/0164379 A1 * | 7/2008 | Wartmann | F41H 5/013 | 245/8 |
| 2009/0022549 A1 * | 1/2009 | Wartmann | E02B 3/023 | 405/60 |
| 2010/0224736 A1 * | 9/2010 | Chen | E04H 17/066 | 245/7 |
| 2010/0294201 A1 * | 11/2010 | Amils | A01K 75/00 | 119/201 |
| 2011/0114028 A1 | 5/2011 | Coffin et al. | | |
| 2011/0154739 A1 * | 6/2011 | Grun | E06B 9/01 | 49/50 |
| 2011/0265729 A1 * | 11/2011 | Atz | A01K 75/00 | 119/226 |
| 2012/0121342 A1 * | 5/2012 | Utz | E01F 7/04 | 405/302.7 |
| 2012/0241565 A1 * | 9/2012 | Wartmann | B21F 27/02 | 245/5 |
| 2013/0251461 A1 * | 9/2013 | Fulde | E02D 17/20 | 405/302.7 |
| 2013/0299040 A1 * | 11/2013 | Atz | A01K 75/00 | 140/3 R |
| 2015/0041599 A1 * | 2/2015 | Wartmann | B21F 27/04 | 245/8 |

FOREIGN PATENT DOCUMENTS

| | | |
|---|---|---|
| CH | 706 178 B1 | 2/2016 |
| DE | 957 933 C | 2/1957 |
| DE | 30 28 019 A1 | 2/1981 |
| DE | 299 13 016 U1 | 10/1999 |
| EP | 1 068 908 A2 | 1/2001 |
| EP | 3 103 926 A1 | 12/2016 |
| WO | 99/43894 A1 | 9/1999 |
| WO | 2012/104412 A1 | 8/2012 |

OTHER PUBLICATIONS

Extended European Search Report dated Apr. 5, 2018 issued in corresponding EP patent application No. 18151841.6 (and partial English translation).

Search Report received Mar. 7, 2018 issued in corresponding ES patent application No. 201830079 (and partial English translation).

Search Report dated May 22, 2017 issued in corresponding DE patent application No. 10 2017 101 754.2 (and partial English translation).

Office Action dated Oct. 26, 2017 issued in corresponding DE patent application No. 10 2017 101 754.2 (and partial English translation).

* cited by examiner

WIRE NETTING AND METHOD FOR PRODUCING A HELIX FOR A WIRE NETTING

CROSS REFERENCE TO RELATED APPLICATION

This application is based on and incorporates herein by reference German Patent Application No. 10 2017 101 754.2 filed on Jan. 30, 2017.

STATE OF THE ART

The present invention refers to a wire netting according to the preamble of claim 1 and a method for manufacturing a helix for a wire netting according to the preamble of claim 10.

From the state of the art wire nettings are known having wire helices which are braided with each other. Such wire helices are produced by repeatedly bending of a wire in a bending direction and have a helical profile. The bending is effected by means of a bending table, which bends the wire about a bending mandrel. The wire is obliquely supplied to the bending mandrel by means of suitable supply rollers, which guide the wire along its longitudinal sides.

The object of the invention is in particular to provide a generic wire netting with advantageous properties with regard to load-bearing capacity. This object is achieved according to the invention by the features of claims 1 and 10, while advantageous embodiments and implementations of the invention may be obtained from the dependent claims.

ADVANTAGES PROVIDED BY THE INVENTION

The invention is based on a wire netting, in particular a safety net, with a plurality of helices which are braided with each other, of which at least one helix is bent from at least one single wire, a wire bundle, a wire strand, a wire rope and/or another longitudinal element with at least one wire, which in particular comprises a high-tensile steel, and comprising at least one first leg, at least one second leg as well as at least one bending region connecting the first leg and the second leg to each other.

It is proposed that the longitudinal element, in particular the wire, is bent at least substantially torsion-free in itself or is bent without any torsion along a contour of the first leg and/or of the second leg.

Due to the inventive configuration of the wire netting, it is in particular possible to obtain a high load-bearing capacity. Advantageously, a wire netting having a high tensile strength may be provided. Moreover, cracks in the mesh, such as those due to impacting objects, may be reduced. Furthermore, a strength of a wire used for manufacturing may be maintained, at least to a large extent. In particular, a tensile strength and/or a fragility and/or a flexural rigidity and/or fracture resistance of the wire used for manufacturing can be modified only to an irrelevant extent or at least only partially in manufacturing. A frequency of wire fractures may be advantageously reduced during manufacturing of a high-tensile wire netting or the wire fractures may be entirely avoided. Moreover, manufacturing inaccuracies due to material irregularities and/or internal stresses may be reduced.

In this context, a "wire" is in particular to be understood as a longitudinal and/or thin and/or at least machine-bendable and/or bendable body. The wire advantageously has along its longitudinal direction a cross section which is at least essentially constant, in particular a circular or elliptical cross section. A particularly preferred wire is a round wire. It may however also be conceived that the wire is at least section-wise or entirely implemented as a flat wire, a square wire, a polygonal wire and/or a profiled wire. The wire may be made, for example, at least partially or also entirely of metal, in particular a metal alloy, and/or an organic and/or inorganic plastic and/or a composite material and/or an inorganic non-metallic material and/or a ceramic material. It is conceivable, for example, that the wire is a polymeric wire or a plastic material wire. In particular, the wire may be a composite wire, such as a metallic-organic composite wire and/or a metallic-inorganic composite wire and/or a metallic-polymeric composite wire and/or a metal-metal composite wire or similar. In particular it may be considered that the wire comprises at least two different materials, which in particular are arranged relatively to each other according to a composite geometry and/or which are at least partially mixed with each other. The wire is advantageously embodied as a metal wire, in particular a steel wire, in particular a stainless-steel wire. If the helix has a plurality of wires, these are preferably identical. It may also be that the helix has a plurality of wires, which differ in particular regarding their material and/or their diameter and/or their cross section. The wire has preferably a coating, in particular corrosion-resistant, and/or a jacket such as a zinc coating and/or an aluminum-zinc-coating and/or a plastic coating and/or a PET-coating and/or a metal-oxide coating and/or a ceramic coating or similar. The longitudinal element is preferably the wire.

The transversal extension of the helix is longer, in particular much longer than a diameter of the wire and/or a diameter of the longitudinal element of which the helix is implemented. Depending on the application and in particular a desired load-bearing capacity and/or desired spring characteristics of the wire netting, in particular in a frontal direction, the transversal extension may, for example, be two times or three or five or ten or 20 times the diameter of the longitudinal element, wherein intermediate values or smaller values or larger values are conceivable. Moreover, depending on an application, the wire may have a diameter of, for example, about 1 mm, about 2 mm, about 3 mm, about 4 mm, about 5 mm, about 6 mm, about 7 mm or even more or even less or also an intermediate diameter value. Larger, in particular much larger diameters are also conceivable if the longitudinal element comprises a plurality of components, in particular a plurality of wires, such as, for example, in case of a wire rope or a strand or a wire bundle or similar. By a "main extension plane" of an object is in particular a plane to be understood which is parallel to a largest side surface of the smallest theoretical rectangular cuboid which is just completely enveloping the object, and in particular extends through the center point of the rectangular cuboid.

In particular, the wire netting is configured as a slope protection, a safety fence, a guard fence, a protective net against rockfall, a blocking fence, a fish farming net, a safety net against predators, a corral fence, a tunnel safeguarding, a protection from earth flows, a protection fence for motor sports, a street fence, an avalanche protection or similar. In particular, due to its high-tensile and/or load-bearing capacity, applications may be envisaged as a cover and/or envelope, for example for power plants, factory buildings, residential buildings or other buildings, for explosion protection, bullet proofing, shielding against flying objects, fishing nets, collision protection or similar. The wire netting may for example be applied, deployed and/or positioned and/or mounted horizontally or vertically or obliquely, in particular with respect to a ground. The wire netting is in particular embodied planar. The wire netting is advantageously constructed in a regular and/or periodical way, at least in one direction. The wire netting may be preferably rolled up or out, in particular about an axis, which is parallel to the main extension direction of the helix. In particular, a rolled-up roll of wire netting may be rolled out in a direction perpendicular to the main extension direction of the helix.

The wire netting preferably has a plurality of in particular identical meshes. The helices especially advantageously form the meshes.

Preferably, the helix has a spiral shape. In particular, the helix is embodied as a flattened spiral. The helix is provided along its contour with a diameter and/or cross-section which is at least essentially constant or is constant. The helix and/or the wire and/or the longitudinal element have a circle-shaped cross-section. Particularly preferably the helix has a plurality of legs, which are advantageously implemented at least substantially identical or are identical. The helix is preferably composed of a single, in particular continuous, wire.

"At least substantially identical" objects is in particular to mean, in this context, objects which are configured in such a way that they are respectively capable of fulfilling a common function and which differ in their construction, except for manufacturing tolerances, at most by single elements, which are irrelevant for the common function. Preferably, "at least substantially identical" means that they are identical, except for manufacturing tolerances and/or in the context of manufacturing possibilities. An "at least substantially constant value" in particular means, in this context, a value which varies at most by 20%, advantageously at most 15%, in particular at most 10%, preferably at most 5% and in particular at most 2%. An object having an "at least substantially constant cross section" is in particular to mean that for an arbitrary first cross section of the object along at least one direction and an arbitrary second cross section of the object along the direction, a minimum surface area of a difference surface, which is formed by overlapping the cross sections, is at most 20%, advantageously at most 10% and especially advantageously at most 5% of the surface area of the larger of the two cross sections.

In particular, the helix has a longitudinal direction. Preferably, the longitudinal direction of the helix is arranged at least substantially parallel or parallel to a main extension direction of the helix. Preferably, the helix has a longitudinal axis extending parallel to the longitudinal direction of the helix. Preferably, the main extension plane of the helix is arranged at least substantially parallel to the main extension plane of the wire netting, at least in a planarly unfolded and/or planarly rolled-out state of the wire netting, which may in particular differ from an installed state of the wire netting. A "main extension direction" of an object is intended to mean, in particular, a direction which runs parallel to a longest edge of a smallest imaginary rectangular cuboid, which just still completely encloses the object. "At least substantially parallel" should mean in particular an orientation of a direction relative to a reference direction, in particular in a plane, wherein the direction has a deviation relative to the reference direction, which is in particular less than 8°, advantageously less than 5° and particularly advantageously less than 2°.

Preferably, the wire netting has a plurality or a multiplicity of, in particular at least substantially identically formed or in particular identically, formed helices. It is also conceivable that the wire netting is composed of several different helices. In particular, it is conceivable that the wire netting has a plurality or multiplicity of first helices and a plurality or multiplicity of second helixes of different construction with respect to the first helices, which are in particular arranged alternately. The helices are advantageously connected to each other. In particular, adjacent helices are arranged such that their longitudinal directions are parallel. Preferably, a respective helix is braided and/or twisted into two helices which are adjacent to said helix. In particular, the wire netting is producible by twisting a helix into a pre-netting, twisting a further helix into this twisted-in helix, twisting a helix into this further twisted-in helix in turn, and so on. In particular, the helices of the wire netting have the same direction of rotation. Advantageously, in each case two helices are knotted with one another, in particular respectively at a first of their ends and/or respectively at a second of their ends situated opposite their first ends.

Preferably, a torsional state of the longitudinal element, in particular of the wire, in the helix corresponds to a torsional state of the longitudinal element, in particular of the wire, before a bending of the longitudinal element, in particular of the wire, to form the helix. In particular, the longitudinal element, in particular the wire, is twisted in itself in particular about its longitudinal axis along a section of the helix which comprises at least three bending regions, advantageously at least four bending regions, more preferably at least 5 bending regions, preferably at least 10 bending regions, more preferably at least 15 bending regions and in a particularly preferable case at least 20 bending regions, by less than a complete rotation. In particular, the longitudinal element is twisted in itself along a section of the helix which comprises a certain number of bending regions, by an angle which is smaller, advantageously at least twice smaller, especially advantageously at least three times smaller, preferably at least five times smaller and especially advantageously at least ten times smaller than a sum of all bending angles of all bending regions of the section. Preferably, the longitudinal element, in particular the wire, has a smaller torsion than the one a longitudinal element would have in the case of a bending of bending regions, in which the longitudinal element to be bent is retained in such a way that a rotation about its longitudinal axis is prevented.

In particular, the wire is at least partially, in particular entirely except for a coating, made of high-tensile steel. For example, the high-tensile steel may be spring steel and/or a steel suitable for wire ropes. In particular, the wire has a tensile strength of at least 800 N mm$^{-2}$, advantageously at least 1000 N mm$^{-2}$, especially advantageously at least 1200 N mm$^{-2}$, preferably of at least 1400 N mm$^{-2}$, and more preferably at least 1600 N mm$^{-2}$, in particular a tensile strength of about 1770 N mm$^{-2}$ or of about 1960 N mm$^{-2}$. It is also conceivable that the wire has an even higher tensile strength, for example a tensile strength of at least 2000 N mm$^{-2}$, or of at least 2200 N mm$^{-2}$, or even at least 2400 N mm$^{-2}$. In this way, a high load-bearing capacity, in particular a high tensile strength and/or a high rigidity are achievable transversally to the mesh.

In an advantageous embodiment of the invention it is proposed that the longitudinal element, in particular the wire, is bent, at least substantially without any torsion in itself or without any torsion in itself, along a contour of the bending region. In particular the longitudinal element, in particular the wire, is bent, at least substantially without any torsion in itself or without any torsion in itself, along a contour of the helix. The helix is advantageously free of torsion. The wire netting is preferably braided from helices which are bent without torsion. In this way, a durable connection may be advantageously established between adjacent helices of a wire netting. Moreover, in this way, breakage in the area of bending regions may be avoided.

In a particularly preferred embodiment of the invention it is proposed that a surface structure of the first leg and/or of the second leg has a preferential direction which is parallel to a main extension direction of the first leg and/or of the second leg. The first leg and/or the second leg advantageously have at least one surface structure element extending parallel to the main extension direction of the first leg and/or of the second leg. For example, the surface structure element may be embodied as a ridge, in particular of less than 50 µm, preferably less than 20 µm and particularly advantageously of less than 10 µm, and/or as a region of material disposed on a wire surface and/or as a surface texture. In particular, the surface structure comprises a plurality of surface structure elements. Advantageously a plurality of surface structure elements extends at least substantially parallel or parallel to the main extension direction of the first leg and/or of the second leg. In particular, the preferential direction is equivalent to an average direction of individual contours of the surface structure elements. In particular, the coating of the wire implements the surface structure. It may also be conceived that the wire is not coated and implements the surface structure. In this way, a high tensile strength may be achieved.

Moreover, it is proposed that the surface structure of the first leg and/or of the second leg is free from partial structures extending spirally and/or helically with respect to the main extension direction of the first leg and/or second leg, in particular rotating and/or winding about the longitudinal direction of the helix. In this way, a breaking or rupturing of a wire netting in the area of a leg may be avoided.

Moreover, it is proposed that, in a transverse view, parallel to a main extension plane of the helix and perpendicularly to a longitudinal direction of the helix, the bending region at least section-wise follows an at least approximately straight contour, in particular a straight contour. "At least approximately straight" is in particular to mean, in this context, straight, preferably linear, within manufacturing tolerances. Preferably in the transversal view a section of the bending region follows the at least approximately straight or straight contour, wherein this section comprises at least 50%, advantageously at least 75% and particularly advantageously at least 85% of the bending region. The bending region is curved in the section, in particular in an area of the bending region, in a plane which is parallel to the approximately straight contour of the bending region. In the frontal view, the approximately straight contour preferably is at least substantially parallel or parallel to the longitudinal direction of the helix. This allows providing a bending region with a high tensile strength and/or with a high flexural rigidity. Furthermore, this allows a favorable geometry with regard to a connecting of bending regions of different helices.

It is also proposed that, in the transverse view, the helix follows at least section-wise a stepped, in particular obliquely stepped contour. Preferably, the first leg, the bending region and the second leg in the transverse view form the stepwise contour, wherein the bending region or at least its approximately straight contour includes with the first leg and/or with the second leg an angle which is equivalent to a gradient angle of the bending region.

A high stability of a wire netting transversally to its surface can be achieved if the first leg and/or the second leg at least section-wise follow a straight contour. Advantageously, the first leg and the second leg form straight sides of a mesh of the wire netting. Particularly advantageously the entire first leg and/or the entire second leg are embodied straight. In particular, the first leg and/or the second leg have a length of at least 1 cm, advantageously of at least 2 cm, particularly advantageously of at least 3 cm, preferably of at least 5 cm and particularly preferably of at least 7 cm. However, the first leg and the second leg can have any other lengths, in particular considerably greater lengths. For example, the first leg and/or the second leg may have a length of at least 10 cm or at least 15 cm or at least 20 cm or at least 25 cm or an even greater length, especially in a case where the helix is embodied as a strand of wire, a wire rope, a wire bundle or similar.

In a further embodiment of the invention, it is proposed that the first leg runs at least section-wise in a first plane and the second leg extends at least section-wise in a second plane that is parallel to the first plane. In particular, at least two adjacent legs of the helix extend in parallel planes. Advantageously, the first leg extends in the transverse view parallel to the second leg. Preferably, the first leg and the further first leg extend in the first plane and/or the second leg and the further second leg extend in the second plane. Preferably, the first plane defines a front side of the wire netting and/or the second plane defines a rear side of the wire netting or vice versa. As a result, a wire netting with a double-surface and/or a double-walled structure can be provided. Preferably, forces acting transversely to the mesh can thereby be effectively accommodated with minimal deformation of the mesh.

Furthermore, the invention refers to a method for manufacturing a helix for a wire netting, in particular for a safety net, wherein the helix is bent from at least one single wire, a wire bundle, a wire strand, a wire rope and/or another longitudinal element with at least one wire, which in particular comprises a high-tensile steel, in such a way that it comprises at least one first leg, at least one second leg as well as at least one bending region connecting the first leg and the second leg to each other.

It is proposed that the longitudinal element, in particular the wire, is at least substantially bent, without any torsion in itself, along a contour of the first leg and/or of the second leg.

With the inventive method, advantageous properties related to load-bearing capacity of a wire netting may be achieved. Advantageously a wire netting may be provided with a high tensile strength. Moreover, fractures in the mesh, such as those caused by impacting objects, may be reduced. Moreover, a strength of a wire used for manufacturing can be maintained, at least for the most part. In particular, in manufacturing a tensile strength and/or fragility and/or flexural rigidity and/or break resistance of a wire used for manufacturing are only slightly or at least only partially modified. Wire ruptures may be avoided or at least reduced in manufacturing of high-tensile wire nettings. Moreover, manufacturing errors due to material stresses may be reduced.

The longitudinal element, in particular the wire, is bent by means of at least one bending device. Particularly preferably, the bending device has at least one bending table. The bending device has at least one bending mandrel, about which during a bending the longitudinal element, in particular the wire, is bent, in particular by the bending table. The wire is preferably supplied to the bending mandrel under an angle which is different from 90° and which is in particular equivalent to a gradient angle of the first leg with respect to the longitudinal direction of the helix.

In particular, the method is provided for manufacturing the wire netting. The method preferably comprises a step for producing and/or implementing at least one of the features of the wire netting. "Provided" should in particular mean, specifically programmed, designed and/or equipped. The fact that an object is provided for a certain function is in particular intended to imply that the object fulfills and/or performs this function in at least one application and/or operating state. The fact that a method is "provided" for a certain purpose is in particular to mean that the method contains at least one method step which is specifically directed to the purpose, and/or that the method is specifically directed to the purpose, and/or that the method serves to fulfill the purpose and is at least partially optimized for said fulfilment.

The fact that a method step is "provided" for a purpose is in particular to mean that the method step is specifically directed to the step, and/or that the method step is specifically targeted at the purpose, and/or that the method step serves to fulfill the purpose and is at least partially optimized toward said fulfilment.

It is also proposed that the longitudinal element, in particular the wire, is supplied to the bending device for bending, wherein the longitudinal element, in particular the wire, during supply is rotated about its longitudinal axis. Preferably a rotation direction of the longitudinal element, in particular the wire, during supply, is equivalent to a sense of rotation of the helix. In particular, the longitudinal element, in particular the wire, is rotated about its longitudinal axis in such a way that a torsion occurring during bending about the bending mandrel is compensated. Thus, a twisting of a wire during a bending of a helix may be advantageously avoided.

Moreover, it is proposed that the longitudinal element, in particular the wire, passes through a rotating orienting apparatus. The orienting apparatus is rotated about the longitudinal axis of the longitudinal element, in particular the wire, in particular with a rotation speed, which is in particular at least substantially equivalent to a rotation speed of the longitudinal element, in particular the wire, about its longitudinal axis. Preferably the orienting apparatus is supported rotatably about the longitudinal axis of the longitudinal element, in particular the wire. Thus, a high manufacturing precision at high throughput may be achieved.

In a preferred embodiment of the invention it is proposed that the longitudinal element, in particular the wire, is unwound from a co-rotated reel. The reel is preferably supported rotatably about an unwinding axis. Especially advantageously the reel, in particular an unwinding bearing of the reel, is supported rotatably about a rotation axis. In particular, the rotation axis of the reel is different from the unwinding axis of the reel. The unwinding axis of the reel is preferably perpendicular to the rotation axis of the reel. In particular, the unwinding axis is rotated about the rotation axis during co-rotation of the reel. In particular, a rotation of the reel is synchronized with a rotation of the orienting apparatus. In particular, the reel is co-rotated about the rotation axis of the reel with a rotation speed which is in particular at least substantially equivalent to a rotation speed of the longitudinal element, in particular of the wire, about its longitudinal axis. "At least substantially" should mean in this context in particular that a deviation from a given value is in particular less than 15%, preferably less than 10% and in particular less than 5% of the given value. Thus, a long operating life between exchanging of the wire is advantageously achievable. Moreover, a twisting of the wire during feeding to a bending device may be prevented.

In a particularly preferred embodiment of the invention it is proposed that by at least one adjustment of the rotation speed of the longitudinal element, in particular of the wire, a torsion of the longitudinal element, in particular of the wire, during bending by the bending device is compensated. In particular, the rotation speed of the longitudinal element, in particular of the wire, at least substantially corresponds to a torsion speed of the longitudinal element, in particular of the wire, caused by the bending. Thus, a fast and precise manufacturing of torsion free helices for a wire netting may be achieved.

It is also proposed that, for bending of the bending region, the longitudinal element, in particular the wire, is rotated at least by a compensating angle, which corresponds to an angle between the first leg and the second leg in a front view perpendicular to a main extension plane of the helix, in particular an angle between a longitudinal axis of the first leg and a longitudinal axis of the second leg. In particular, the longitudinal element, in particular the wire, is rotated by the compensation angle for each bended bending region. An angular velocity of the rotation of the longitudinal element, in particular of the wire, advantageously corresponds to the angle between the first leg and the second leg in the front view, multiplied by a manufacturing rate of a bending of bending regions. In this way a compensating rotation of a longitudinal element may be advantageously adapted to a geometry of a helix that is to be bent.

Advantageous properties related to a precise and/or fast manufacturing of a wire netting having a high load-bearing capacity may be obtained with a manufacturing device for manufacturing a wire netting, which is provided for performing the inventive method.

A wire netting according to the invention, a bending device according to the invention and a method according to the invention are herein not to be restricted to the applications and implementation forms described above. In particular, to fulfill a functionality herein described, a wire netting according to the invention, a bending device according to the invention and a method according to the invention may comprise a number of respective elements and/or structural components and/or units and/or method steps that differs from a number herein mentioned.

DRAWINGS

Further advantages may be obtained from the following description of the drawings. In the drawings, two exemplary embodiments of the invention are shown.

The drawings, the description and claims contain various characteristics in combination. The skilled in the art may advantageously also consider the characteristics individually and then combine them in further reasonable combinations.

In particular:

Figure 4A:
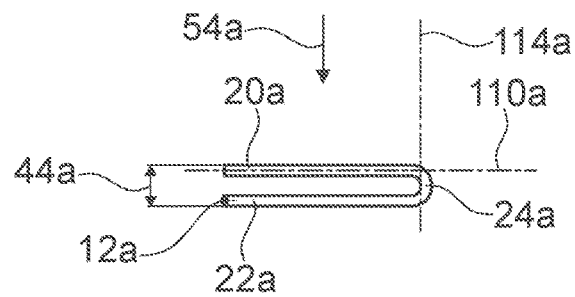
Figure 4B:
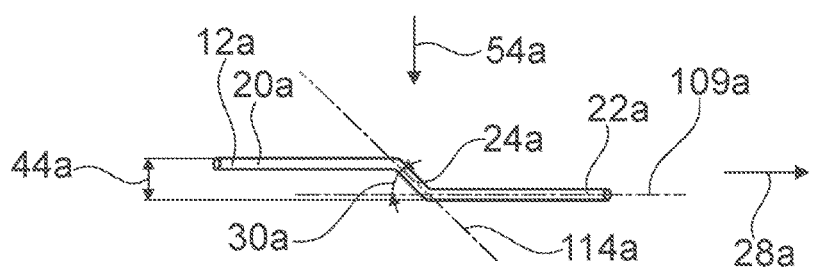
Figure 4C:
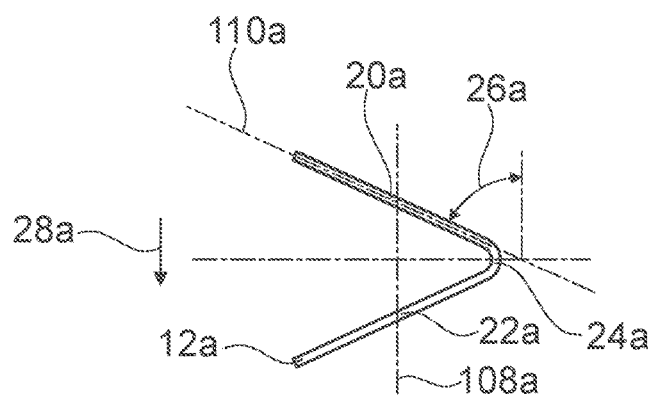
Figure 4D:
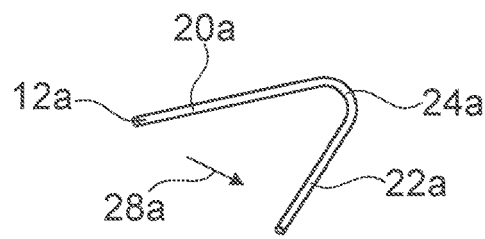
Figure 5A:
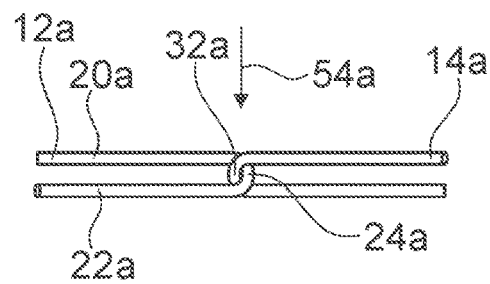
Figure 5B:
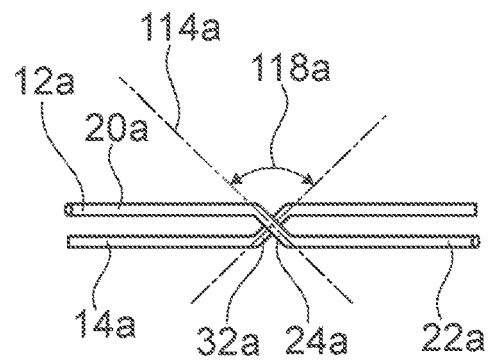
Figure 5C:
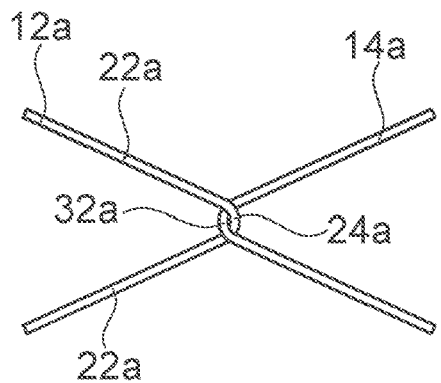
Figure 5D:
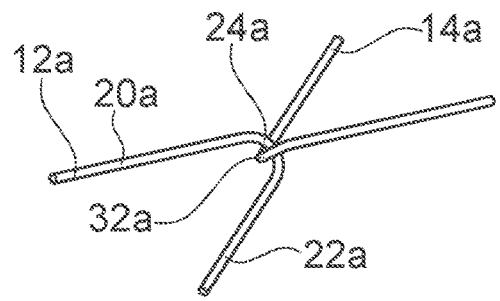
Figure 6:
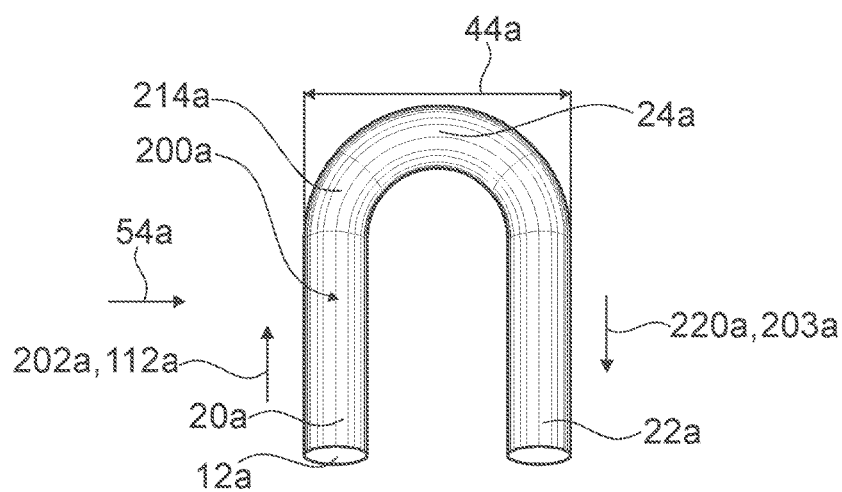
Figure 7:
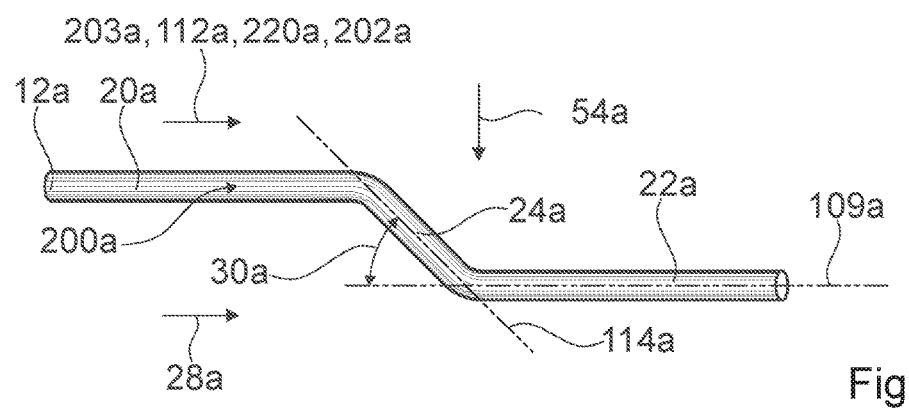
Figure 8:
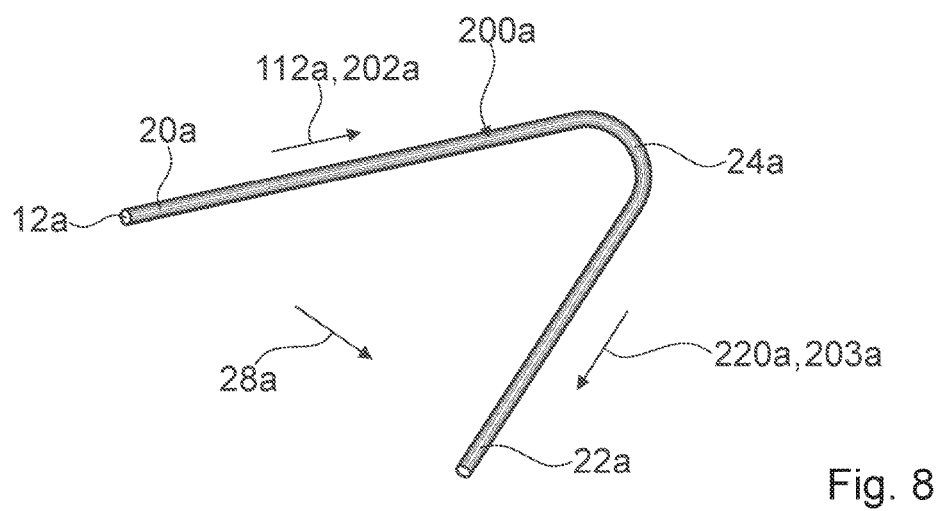
Figure 9:
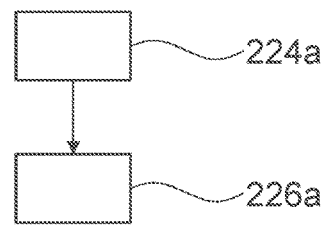
Figure 10:
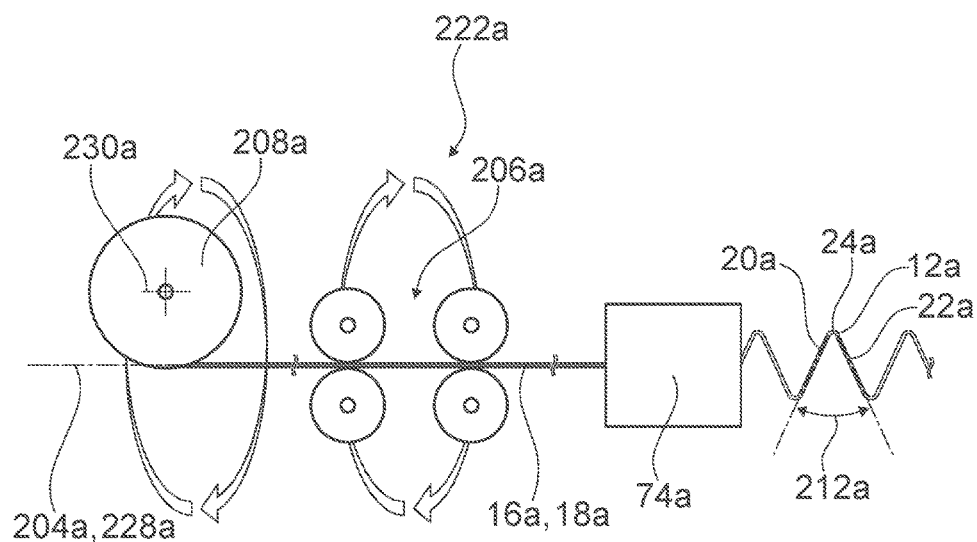
Figure 11:
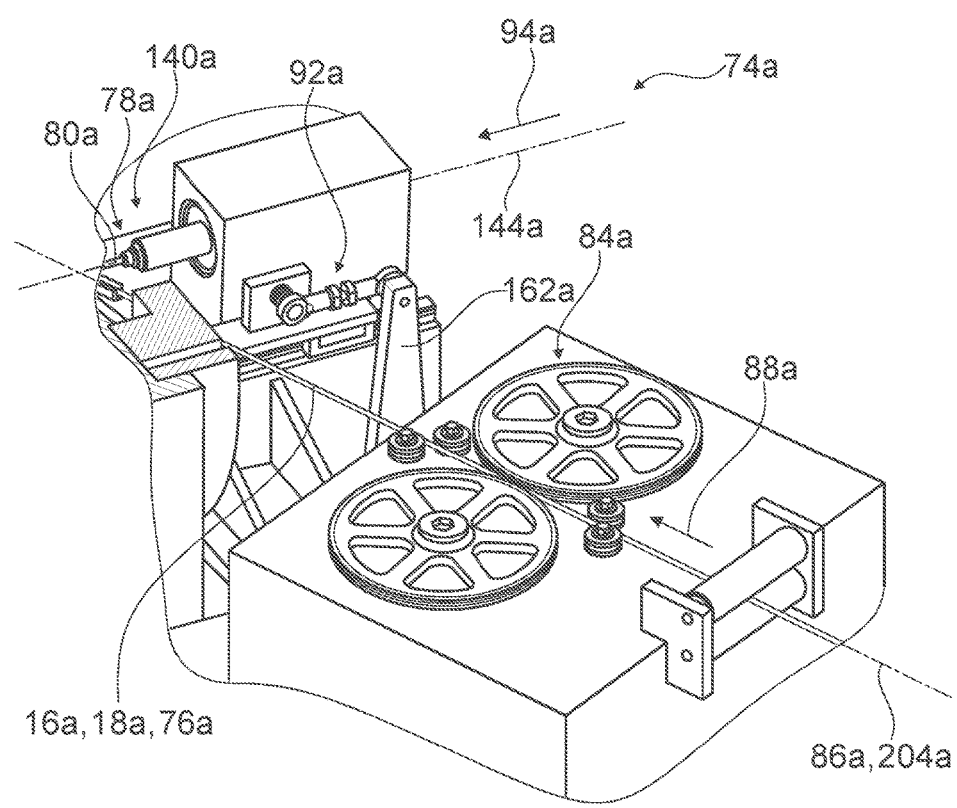
Figure 12:
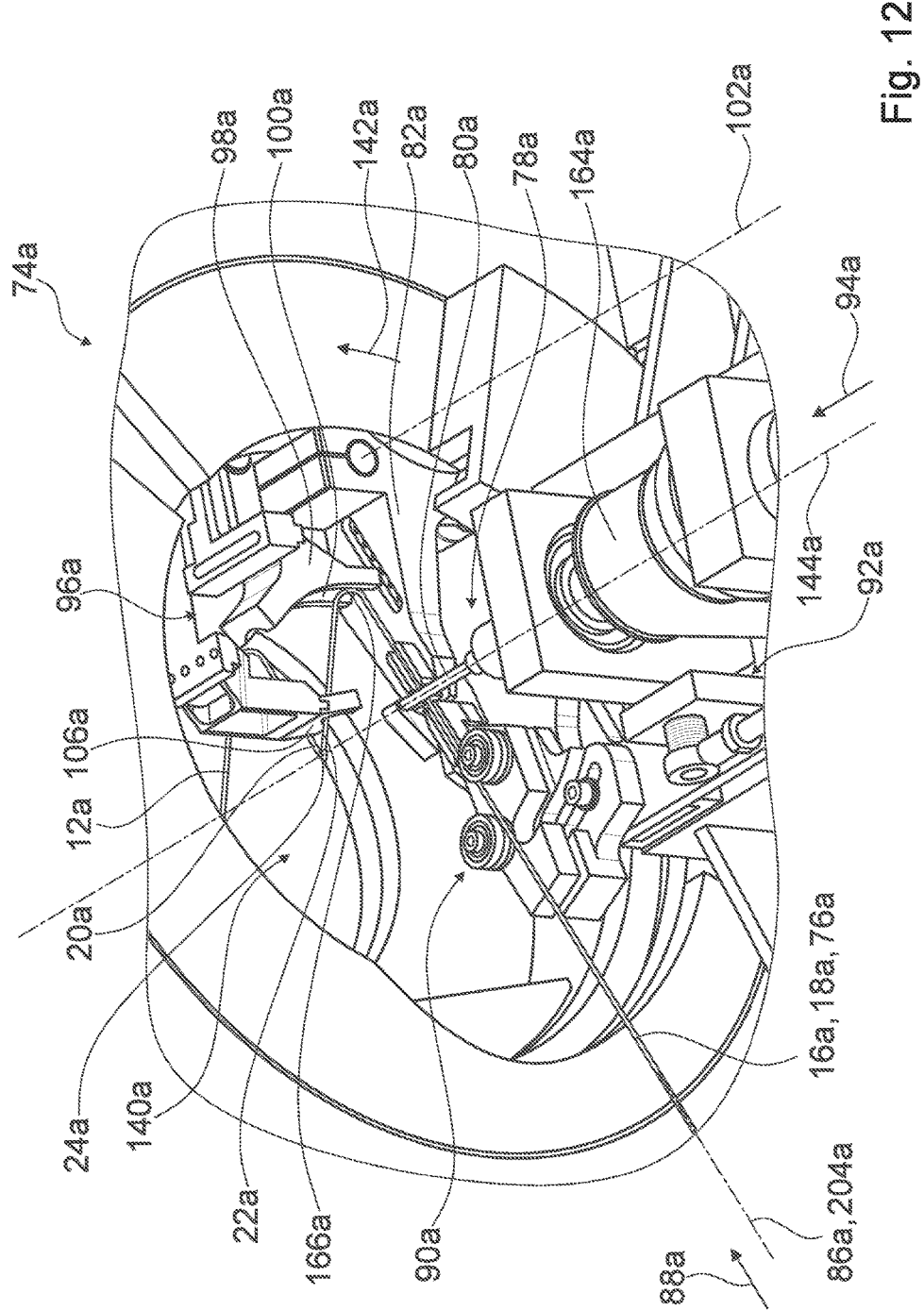
Figure 13:
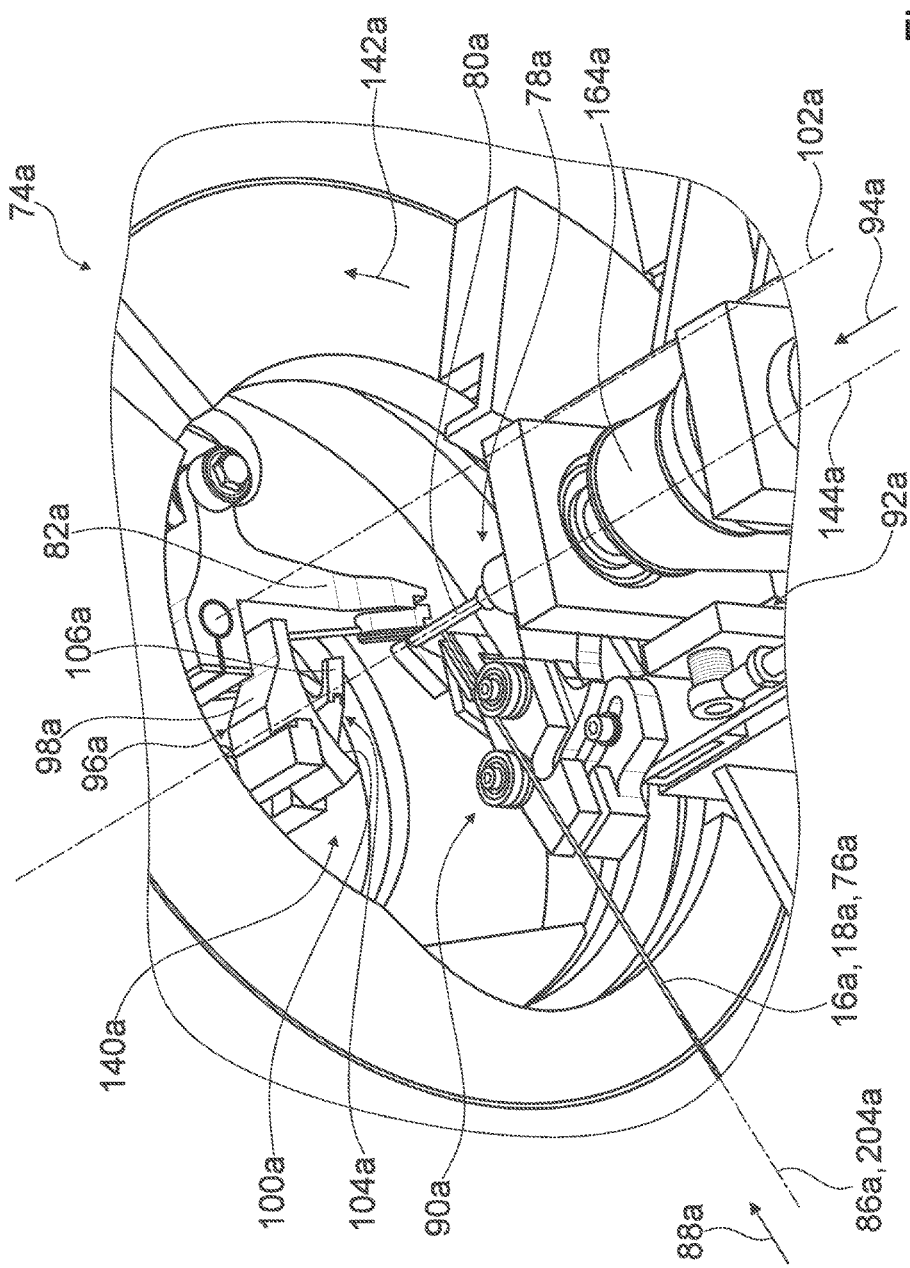
Figure 14:
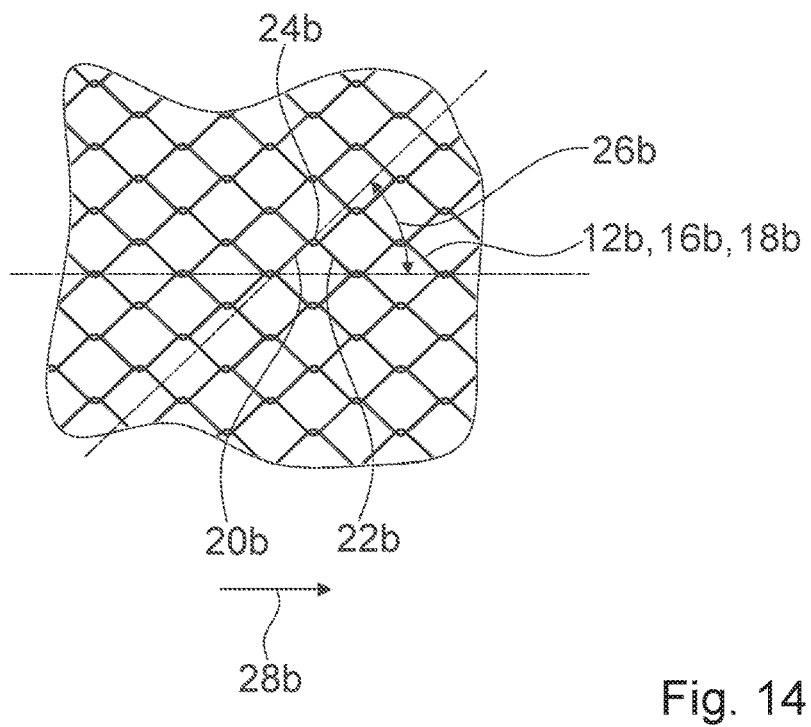
Figure 15:
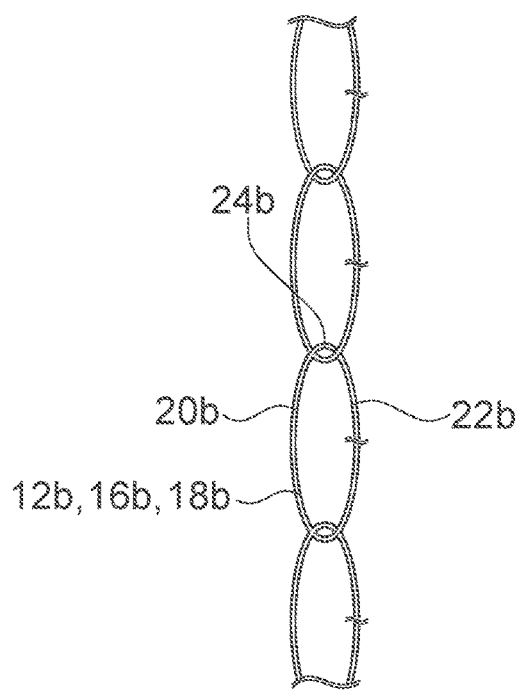

FIGS. 4a to 4d show two legs and a bending region of the helix in different views, FIGS. 5a to 5d show two interconnected bending regions of two helices in different views, FIG. 6 shows a part of the helix in a longitudinal view, in a schematic representation, FIG. 7 shows a part of the helix in a transverse view, in a schematic representation, FIG. 8 shows a part of the helix in a perspective view, FIG. 9 shows a schematic flow chart of a method for producing the wire netting, in a schematic representation, FIG. 10 shows a manufacturing device for producing the wire netting, in a schematic representation, FIG. 11 shows a bending device of the manufacturing device in a perspective view, FIG. 12 shows a bending space of the bending device in a first operating condition in a perspective view, FIG. 13 shows the bending space in a second operating condition in a perspective view, FIG. 14 shows a part of another wire netting in a schematic front view and FIG. 15 shows a part of the further wire netting in a longitudinal view, in a schematic representation.

DESCRIPTION OF THE EXEMPLARY EMBODIMENTS

Figure 1:
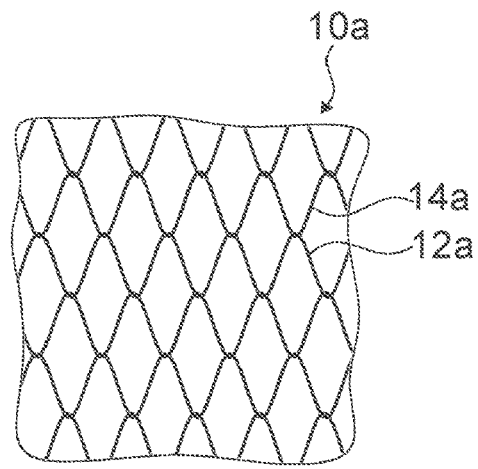
FIG. 1 shows a part of a wire netting in a schematic front view.

FIG. 1 shows a part of a wire netting 10a in a schematic front view. The wire netting 10a is formed as a safety net. The wire netting 10a shown can be used for example as a slope protection, landslide protection net, security fence or the like. The wire netting 10a has a plurality of helices 12a, 14a braided with each other, in particular a helix 12a and another helix 14a. In the present case, the wire netting 10a has a plurality of identically formed helices 12a, 14a, which are screwed into one another and form the wire netting 10a.

Figure 2:
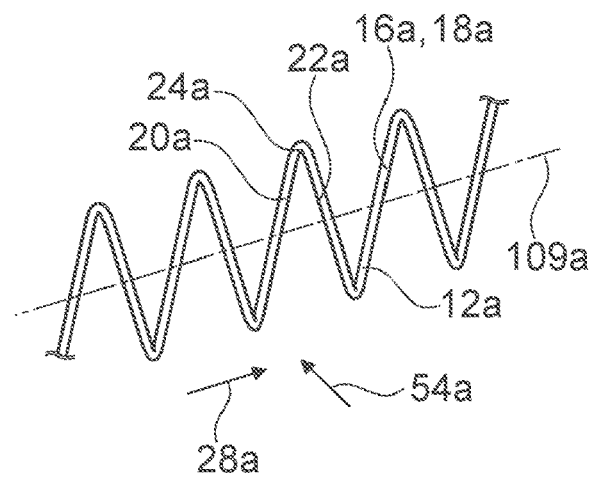
FIG. 2 shows a part of a helix of the wire netting in a perspective view.
Figure 3:
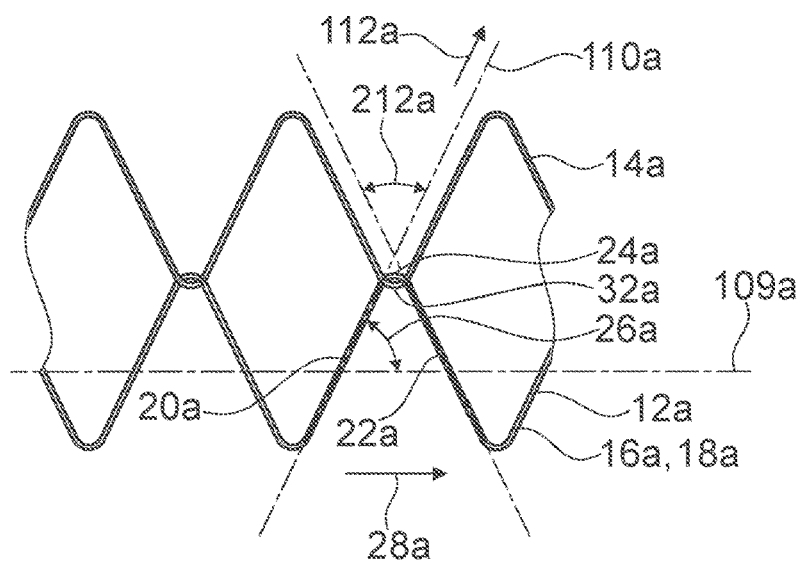
FIG. 3 shows another part of the wire netting in a schematic front view.

FIG. 2 shows part of the helix 12a of the wire netting 10a in a perspective view. FIG. 3 shows another part of wire netting 10a in a schematic front view. The helix 12a is made of a longitudinal element 16a. The longitudinal element 16a has a wire 18a. In the present case, the longitudinal element 16a is the wire 18a. But it is also conceivable that a longitudinal element a plurality of wires and/or other elements. For example, a longitudinal element may be formed as a wire rope, a wire bundle, a wire strand or similar. The following describes the properties of the wire 18a. However, these are transferable to the case of other longitudinal elements accordingly. In a manner analogous to the wire 18a shown, for example, a stranded wire or a wire bundle or other longitudinal element may be bent into a helix and helices of such longitudinal elements may be connected correspondingly to form a wire netting.

In the present case, the wire 18a is formed as a single wire. The wire 18a has a corrosion resistant coating. The wire 18a is bent to form the helix 12a. The helix 12a is integrally formed. The helix 12a is formed by a single piece of wire. In the present case, the wire 18a has a diameter of 3 mm. The wire 18a is at least partially made of a high-tensile steel. The wire 18a is formed by a high-tensile steel wire. The wire 18a has a tensile strength of at least 800 N mm$^{-2}$. In the present case, the wire 18a has a tensile strength of about 1770 N mm$^{-2}$. Of course, as mentioned above, however, other tensile strengths are conceivable, in particular also tensile strengths of more than 2200 N mm$^{-2}$. In particular, it is conceivable that a wire is made of very high-tensile steel. It is also conceivable that a wire has a different diameter, like for example less than 1 mm or about 1 mm or about 2 mm or about 4 mm or about 5 mm or about 6 mm or even larger diameter. As mentioned above, it is conceivable that a wire has different materials and in particular is configured as a composite wire.

The helix 12a and the further helix 14a are identical. in the following an example of the helix 12a is thus described in more detail. It is however conceivable that a wire netting comprises at least one first helix and at least one second helix formed differently from the first helix.

The helix 12a has a first leg 20a, a second leg 22a and a bending region 24a connecting the first leg 20a and the second leg 22a. In the present case, the helix 12a has a plurality of first legs 20a, a plurality of second legs 22a and a plurality of bending regions 24a, which are not all provided with reference numerals for reasons of clarity. Furthermore, in the present case, the first legs 20a are at least substantially identical to each other. Moreover, in the present case, the second legs 22a are at least substantially identical to each other. Moreover, in the present case, the bending regions 24 are at least substantially identical to each other. In the following the first leg 20a, the second leg 22a and the bending region 24a are thus shown in more detail. It is obvious that a wire netting may have different first legs and/or different second legs and/or different bending regions.

The helix 12a has a longitudinal direction 28a. The helix 12a has a longitudinal axis 109a, which is parallel to the longitudinal direction 28a. The longitudinal direction 28a is equivalent to a main extension direction of helix 12a. In a front view, perpendicular to a main extension plane of helix 12a, the first leg 20a extends with a first gradient angle 26a with respect to longitudinal direction 28a of helix 12a. In particular, the front view is directed in the front direction 54a. The first leg 20a has a longitudinal axis 110a. The longitudinal axis 110a of first leg 20a is parallel to a main extension direction 112a of the first leg 20a. In FIG. 3, the helix 12a is shown in the front view. The longitudinal axis 109a of helix 12a and longitudinal axis 110a of first leg 20a form the first gradient angle 26a. The first leg 20a herein has a length of about 65 mm. The second leg 22a has a length of about 65 mm.

FIGS. 4a to 4d show a section of helix 12a, which comprises the first leg 20a, the second leg 22a and the bending region 24a, in different views. FIG. 4a shows a view in the longitudinal direction 28a of the helix 12a. FIG. 4b shows the first leg 20a, the second leg 22a and the bending region 24a in a transverse view perpendicular to the longitudinal direction 28a of the helix 12a and in the main extension plane of the helix 12a. FIG. 4c shows a view in the frontal direction 54a. FIG. 4d shows a perspective view. In the transverse view, the bending region 24a extends at least section-wise with a second gradient angle 30a different from the first gradient angle 26a with respect to the longitudinal direction 28a of the helix 12a. In the transverse view, the bending region 24a has a longitudinal axis 114a. The longitudinal axis 114a of the bending region 24a and the longitudinal axis 109a of the helix 12a include the second gradient angle 30a.

The second gradient angle 30a differs by at least 5° from the first gradient angle 26a. The second gradient angle 30a has a value between 25° and 65°. Furthermore, the first gradient angle 26a is greater than 45°. In the present case, the first gradient angle 26a is about 60°. Furthermore, in the present case, the second gradient angle 30a is about 45°. The second gradient angle 30a is smaller than the first gradient angle 26a. Of course, it is also conceivable that a first gradient angle and a second gradient angle are identical. For example, a first gradient angle and a second gradient angle both may each be at least substantially or exactly equal to 45°. Other values are also conceivable, for example 30° or 35° or 40° or 50° or 55° or 60° or 65° or 70° or other, in particular even larger or even smaller values. Values for a first gradient angle and a second gradient angle will be suitably selected by the skilled in the art, in particular according to a requirement profile for a corresponding wire netting.

The bending region 24a follows, in a transverse view, at least section-wise, an at least approximately straight path. In the present case, a large part of the bending region 24a follows the straight path in the transverse view.

In the transverse view, the helix 12a follows a stepwise progression, at least section-wise. The stepwise path is obliquely stepped.

The first leg 20a follows, at least section-wise, a straight path. In the present case, the first leg 20a follows a straight path. The second leg 22a follows at least section-wise a straight path. In the present case, the second leg 22a follows a straight path. The first leg 20a and/or the second leg 22a are free of a curvature and/or a bending an/or a kink. The bending region 24a has a contour which, in a longitudinal view parallel to the longitudinal direction 28a of the helix 12a, describes a bend of 180°. In FIG. 4a, the helix 12a is shown in the longitudinal view.

The first leg 20a extends at least section-wise, in particular completely, in a first plane and the second leg 22a extends at least section-wise, in particular completely, in a second plane parallel to the first plane. In the longitudinal view, the first leg 20a runs parallel to the second leg 22a.

The further helix 14a has a further bending region 32a. The bending region 24a and the further bending region 32a are connected. The bending region 24a and the further bending region 32a form a coupling point of the helix 12a to the further helix 14a.

FIGS. 5a to 5d show a part of the wire netting 10a, which comprises the bending region 24a and the further bending region 32a, in different views. FIG. 5a shows a view in the longitudinal direction 28a of the helix 12a. FIG. 5b shows the part of the wire netting 10a in a transverse view perpendicular to the longitudinal direction 28a of the helix 12a in the main extension plane of the helix 12a. FIG. 5c shows a view in the frontal direction 54a. FIG. 5d shows a perspective view.

The helix 12a and the further helix 14a intersect at least substantially perpendicularly in a region of the further bending region 32a. In the transverse view, the bending region 24a and the further bending region 32a include an intersection angle 118a. The intersection angle 118a depends on the second gradient angle 30a and a correspondingly defined further second gradient angle of further helix 14a. Herein, the intersection angle 118a is equal to 90°.

Also for other first gradient angles, a second gradient angle of 45° is advantageously selected so that correspondingly configured helixes intersect perpendicularly at connection points and these connection points advantageously have a high mechanical resilience. Of course, however, also angles differing from 90° are conceivable, for example of 45° or 60° or 120° or 145° or having a larger, smaller or intermediate value. The skilled in the art will select an intersection angle suitably in particular according to a requirement profile for a corresponding wire netting.

FIG. 6 shows part of the helix 12a in a longitudinal view, in a schematic representation. FIG. 7 shows a part of the helix 12a in a transverse view, in a schematic representation. FIG. 8 shows a part of the helix 12a in a perspective view. The wire 18a is bent at least substantially without torsion along a path of the first leg 20a and the second leg 22a. Further, the wire 18a is bent at least substantially without torsion along a path of the bending region 24a.

The first leg 22a is free from torsion. In particular, the first leg 10a is not twisted in itself. The second leg 22a is free of a torsion. In particular, the second leg 22a is not twisted in itself. The bending region 24a is free from torsion along its path. In the transverse view (see FIG. 7), the bending region 24a is free from torsion. It is conceivable that a helix has torsion-free legs but has an at least slightly twisted bending region.

The first leg 20a has a surface structure 200a, which has a preferential direction 202a, which extends parallel to the main extension direction 112a of the first leg 20a. The surface structure 200a of the first leg 20a is free of spiraling or helically extending partial structures with respect to the main extension direction 112a of the first leg 20a.

The surface structure 200a extends over the bending region 24a. The surface structure 200a extends over the second leg 20a. The surface structure 200a has a preferential direction 203a which extends parallel to a main extension direction 220a of the second leg 22a. The surface structure 200a of the second leg 22a is devoid of spirally or helically extending substructures.

The surface structure 200a comprises a plurality of surface structure elements 214a, 216a, 218a, of which not all are provided with reference numerals for reasons of clarity. The surface structure elements 214a, 216a, 218a are formed as ridges on a surface of the wire 18a, in particular as ridges in the micrometer range. The surface structure elements 214a, 216a, 218a are part of a surface texture of the wire 18a. The surface structure elements 214a, 216a, 218a have at least substantially straight contours along the first leg 20a. Furthermore, the surface structure elements 214a, 216a, 218a extend in a region of the bending region 24a parallel to the contour of the bending region 24a. In addition, the surface structure elements 214a, 216a, 218a have at least substantially straight contours along the second leg 22a. The surface structure elements 214a, 216a, 218a extend along the first leg 20a respectively in one plane. The surface structure elements 214a, 216a, 218a extend along the second leg 22a, each in a plane. The surface structure elements 214a, 216a, 218a extend along the bending region 24a in a respective plane. The surface structure elements 214a, 216a, 218a extend on average along the preferential direction 202a, 203a of the surface structure 200a. The preferential direction 202a, 203a of the surface structure 200a follows a contour of the helix 12a.

FIG. 9 shows a schematic flow diagram of a method for manufacturing the wire netting 10a. In a first step 224a, the helix 12a is produced from the wire 18a in such a way that the wire 18a is bent at least substantially without torsion in itself along a path of the first leg 20a and the second leg 22a. In a second step 226a, the helix 12a is braided with a pre-mesh of the wire netting 10a.

FIG. 10 shows a manufacturing device 222a for manufacturing the wire netting 10a. The manufacturing device 222a is provided for manufacturing the wire netting 10a. The manufacturing device 222a has a bending device 74a. The longitudinal element 16a or, in the present case, its wire 18a is bent by means of the bending device, which supplies the wire 18a to a bending step, wherein the wire 18a while being supplied is rotated about its longitudinal axis 204a. Regarding a description of bending device 74a, reference is made to FIGS. 11 to 13. If, instead of the wire 18a, a longitudinal element not configured as a single wire such as a strand and/or a wire bundle or similar is used, this is processed and/or fed and/or bent and/or straightened in a way similar to wire 18a. In the following, however, the case is described, in which the longitudinal element 16a is configured as a wire 18a.

The manufacturing device 222a has a rotating orienting apparatus 206a. In the manufacturing of helix 12a, the wire 18a passes through the rotating orienting apparatus 206a. The orienting apparatus 206a is rotatably mounted about a rotation axis 228a. The rotation axis 228a is equivalent to the longitudinal axis 204a of the wire 18a.

The manufacturing device 222a has a co-rotated reel 208a. In the production of the helix 12a, the wire 18a is unwound from the co-rotated reel 208a. The co-rotated reel 208a is rotatably mounted about the rotation axis 228a. For unwinding the wire 18a from the co-rotated reel 208a, the co-rotated reel 208a is rotated about an unwinding axis 230a, which is perpendicular to the rotation axis 228a. When the co-rotated reel 208a rotates about the rotation axis 228a, the unwinding axis 230a rotates about the rotation axis 228a.

The manufacturing device 222a has a drive unit, not shown, which is provided for rotating the co-rotated reel 208a and the orienting apparatus 206a and thus the wire 18a about the axis of rotation 228a. In the case shown, the orienting apparatus 206a and the reel 208a rotate about the same rotation axis 228a. It is of course also conceivable that the wire 18a between the co-rotated reel 208a and the orienting apparatus 206a is guided around at least one curve and the orienting apparatus 206a is rotated about a different axis of rotation than the reel 208a. In this case, the longitudinal axis 204a of the wire 18a extends in a region of the reel 208a other than in an area of the orienting apparatus 206a.

A twisting of the wire 18a during bending by the bending device 74a is compensated by adjusting a rotational speed of the wire 18a.

The wire 18a is rotated for bending of the bending region 24a at least by a compensation angle that is equivalent to an angle 212a between the first leg 22a and the second leg 22a in a front view perpendicular to a main extension plane of the helix 12a. In particular, the first gradient angle 26a and half of the angle 212a between the first leg 20a and the second leg 22a add up to 90°. Upon bending of the wire 18a by means of the bending device 74a, a twist of the wire 18a is generated for each bent bending region by the angle 212a between the first leg 20a and the second leg 22a. This generated torsion is compensated by the rotation of the wire 18a about its longitudinal axis 204a. The wire 18a is thereby rotated in a direction which is equivalent to a direction of rotation of the helix 12a.

FIG. 11 shows the bending device 74a of the manufacturing device 222a in a perspective view. FIG. 12 shows a bending space 140a of the bending device 74a in a first operating state in a perspective view. FIG. 13 shows the bending space 140a in a second operating state in a perspective view. The bending device 74a is adapted to create the first helix 12a. The bending device 74a is adapted for bending the first helix 12a according to the geometry of the first helix 12a, in particular the legs 20a, 22a and the bending region 24a of the first helix 12a. The bending device 74a is adapted to create the first helix 12a from the wire 18a. The wire 18a, in an unbent state, forms a helix blank 76a. The bending device 74a is provided for manufacturing the first helix 12a by means of bending the helix blank 76a.

The bending device 74a has a bending unit 78a. The bending unit 78 includes a bending mandrel 80a and a bending table 82a. The bending table 82a is provided for bending the helix blank 76a around the bending mandrel 80a. The bending table 82a is supported in order to circulate around the bending mandrel 80a. During manufacturing, the bending table 82a continuously runs in a circulating direction 142a around the bending mandrel 80a. The bending mandrel 80a has a longitudinal axis 144a. The longitudinal axis 144a of the bending mandrel 80a is parallel to a main extension direction 94a of the bending mandrel 80a.

The bending device 74a has a feeding unit 84a which is provided for advancing the helix blank 76a along a feeding axis 86a in a feeding direction 88a. The feeding axis 86a is arranged parallel to the feeding direction 88a. The feeding direction 88a runs parallel to a main extension direction of the helix blank 76a. The feeding axis 86a encloses an angle with the longitudinal axis 144a of the bending mandrel 80a which is at least substantially and in particular exactly equivalent to the first gradient angle 26a. The first gradient angle 26a can be adjusted by adjusting the feeding axis 86a relative to the longitudinal axis 144a of the mandrel 80a.

During manufacture, the helix blank 76a is repeatedly fed. The bending unit 78a, in particular the bending table 82a, bends after the feeding has been completed, the helix blank 76a respectively around the bending mandrel 80a in order to produce a bending region of the manufactured first helix 12a. The feeding unit 84a releases the helix blank 76a during bending so that it can rotate about the longitudinal axis 204a of the wire 18a due to the rotation of the wire 18a. It is conceivable that the wire 18a is guided around at least one curve and its longitudinal axis 204a in a region of the feeding unit 84a and/or in a region of the bending space 140a is different from the axis of rotation 228a of co-rotated reel 208a and/or of the orienting apparatus 206a. A diameter of the bending mandrel 80a defines a bending curvature of the bending region 24a. In particular, the diameter of the bending mandrel 80a defines an inner radius of the bending region 24a.

The bending device 74a has an abutment unit 96a with at least one abutment element 98a defining a maximum feeding position for the helix blank 76a. When feeding, the helix blank 76a can be advanced by the feeding unit 84a up to the maximum feeding position. The helix blank 76a, before bending by the bending table 82a about the bending mandrel 80a, is in the maximum feeding position. In the maximum feeding position, the helix blank 76a abuts the abutment element 98a with the last bent bending region 166a of the first helix 12a. The first operating state shown in FIG. 12 corresponds to a situation immediately before bending the helix blank 76a about the bending mandrel 80a. The helix blank 76a is in the first operating state in the maximum feeding position. The second operating state shown in FIG. 13 corresponds to a situation during the bending of the helix blanks 76a about the bending mandrel 80a. The bending table 82a is displaced in the second operating state along the direction of rotation 142a with respect to its position in the first operating state.

The abutment element 98a is mounted completely circumferentially around the bending mandrel 80a. The abutment element 98a runs, during manufacturing, continuously about the bending mandrel 80a in the direction of circulation 142a.

The bending table 82a is pivotally mounted about a bending axis 102a, which circulates around the bending mandrel 80a itself, in particular in the direction of circulation 142a, while the bending table 82a is rotated about the bending mandrel 80a. The pivot axis 102a moves during manufacture on a circular path. The pivot axis 102a moves at a constant angular velocity during manufacture. During bending, the bending table 82a and the abutment element 98a run around the bending mandrel 80a at the same speed. After bending, the bending table 82a pivots about the pivot axis 102a, thereby defining a maximum bending angle. The bending table 82a then pivots back around the pivot axis 102a, in particular during the advancement of the helix blank 76a. In the first operating state, the abutment element 98a rests on the bending table 82a.

In the present case, the bending mandrel 80a is driven. The bending mandrel 80a is rotatably mounted about its longitudinal axis 144a. The bending mandrel 80a is coupled via a belt 164a to a drive unit, not shown, which in particular further drives the bending table 82a. The bending mandrel 80a is replaceable. The bending unit 78a may be equipped with bending mandrels of different diameters.

A position of the bending table 82a relative to the abutment element 98a is variable during the rotation of the bending table 82a around the bending mandrel 80a.

The abutment element 98a has a concavely curved abutment surface 100a. The abutment surface 100a is curved in the circumferential direction 142a with a circular arc shape. Further, the abutment surface 100a is curved in a circular arc perpendicular to the curvature in the circumferential direction 142a. A radius of this curvature perpendicular to the direction of rotation 142a at least substantially corresponds to a curvature of the bending region 24a. In the maximum feeding position, the last bent bending region 166a bears against the abutment surface 100a, which is circularly curved as an arc about the last bent bending region 166a.

In a feeding operating condition, in which the feeding of the helix blank 76a takes place, the position of the abutment element 98a with respect to the feeding axis 86 is variable. The abutment element 98a thus moves in the feeding state, in particular after the helix blank 76a abuts against the abutment element 98a, i.e. is in the maximum feeding position, along the last bent bending region 166a, in the direction of circulation 142a.

The bending unit 78a is adapted for bending a helix blank with at least one high-strength steel wire. In the present case, the helix blank 76a can be bent by means of the bending unit 78a.

The bending unit 78a is adapted for bending the helix blank 76a by more than 180° in a single revolution, in particular during each revolution of the bending table 82a around the bending mandrel 80a. A bending angle is defined by a time of pivoting of the bending table 82a about the pivot axis 102a. The bending unit 78a is adapted to over-bend the helix blank 76a, in particular to compensate for spring-back of the helix blank 76a after bending due to its high bending stiffness. The bending unit 78a is adapted to provide the bending region 24a with a total angle of exactly 180°, so that the first helix 12a can be made straight in itself.

In FIGS. 14 and 15 a further embodiment of the invention is shown. The following descriptions and the drawings are essentially limited to the differences between the exemplary embodiments, wherein, with regard to identically named components, in particular with regard to components having the same reference numerals, reference can in principle be made also to the drawings and/or the description of the other embodiment, in particular of FIGS. 1 to 13. In order to distinguish the embodiments, the letter a has been added as a suffix to reference numerals of the embodiment in FIGS. 1 to 13. In the embodiment of FIGS. 14 and 15, the letter a is replaced by the letter b.

FIG. 14 shows a part of a wire netting 10b having a plurality of helices 12b braided with each other, at least one helix 12b of which is bent from at least one longitudinal element 16b and at least one first leg 20b, a second leg 22b and comprises at least one first leg 20b, a second leg 22b as well as at least one bending region 24b interconnecting the first leg 20b and the second leg 22b. The longitudinal element 16b is bent at least essentially without torsion along a path of the first leg 20b and the second leg 22b. In particular, a twisted state of the longitudinal member 16b in the wire netting 12b corresponds to a twisted state of a blank of the longitudinal member 16b before it being processed into the wire netting 12b. In the present case, the longitudinal member 16b is formed as a wire strand. The longitudinal element 16b has at least one wire 18b made of high-strength steel. In the present case, the longitudinal element 16b is composed of a plurality of identical wires 18b, which are not shown individually in the figures. In a front view perpendicular to a main extension plane of the helix 12b, the first leg 20b extends at a first gradient angle 26b with respect to the longitudinal direction 28b of the helix 12b. In the present case, the first gradient angle 26b is about 45°. The wire netting 10b of the present case has square meshes.

FIG. 15 shows a portion of the wire netting 10b in a longitudinal view along a longitudinal direction 28b of the helix 12b (see FIG. 14). The first leg 20b and the second leg 22b have a curved contour. The wire netting 10b has bulgy meshes, whereby in particular an impact of objects transversally to the wire netting 10b can be damped.

The helix 12b is manufactured by means of a conventional braiding machine with a braiding knife, which is not shown. The longitudinal member 16b is rotated in the manufacture of the helix 12b about its longitudinal axis to compensate for a torsion occurring during the bending of the longitudinal member 16b by the braiding knife.

REFERENCE NUMERALS 10 wire netting
12 helix
14 helix
16 longitudinal element
18 wire
20 leg
22 leg
24 bending region
26 gradient angle
28 longitudinal direction
30 gradient angle
32 bending region
54 front direction
74 bending device
76 helix blank
78 bending unit
80 bending mandrel
82 bending table
84 feeding unit
86 feeding axis
88 feeding direction
94 main extension direction
96 abutment unit
98 abutment element
100 abutment surface
102 rotation axis
109 longitudinal axis
110 longitudinal axis
112 main extension direction
114 longitudinal axis
118 intersection angle
140 bending space
142 circulation direction
144 longitudinal axis
164 belt
166 bending region 200 surface structure
202 preferential direction
203 preferential direction
204 longitudinal axis
206 orienting apparatus
208 reel
212 angle
214 surface structure element
216 surface structure element
218 surface structure element
220 main extension direction
222 manufacturing device
224 method step
226 method step
228 rotation axis
230 unwinding axis

The invention claimed is:

1. A wire netting, in particular a safety net, with a plurality of helices which are braided with each other, of which at least one helix is bent from at least one single wire, a wire bundle, a wire strand, a wire rope and/or another longitudinal element with at least one wire, which in particular comprises a high-tensile steel, the at least one helix having at least one first leg, at least one second leg as well as at least one bending region connecting the first leg and the second leg to each other, wherein the longitudinal element is bent at least substantially torsion-free in itself along a contour of the first leg and/or of the second leg.

2. The wire netting according to claim 1, wherein the longitudinal element is bent, at least substantially without any torsion in itself, along a contour of the bending region.

3. The wire netting according to claim 1, wherein a surface structure of the first leg and/or of the second leg has a preferential direction which extends parallel to a main extension direction of the first leg and/or of the second leg.

4. The wire netting according to claim 3, wherein the surface structure of the first leg and/or of the second leg is free from partial structures extending spirally with respect to the main extension direction of the first leg and/or of the second leg.

5. The wire netting according to claim 1, wherein, in a transverse view, parallel to a main extension plane of the helix and perpendicularly to a longitudinal direction of the helix, the bending region at least section-wise follows an at least approximately straight course.

6. The wire netting according to claim 5, wherein, in the transverse view, the helix follows at least section-wise a stepped contour.

7. The wire netting according to claim 1, wherein the first leg and/or the second leg at least section-wise follow/follows a straight contour.

8. The wire netting according to claim 1, wherein the first leg runs at least section-wise in a first plane and the second leg extends at least section-wise in a second plane that is parallel to the first plane.

9. The wire netting according to claim 1, wherein the wire comprises a high-tensile steel and/or a tensile strength of at least 800 N mm$^{-2}$.

10. A method for manufacturing a helix for a wire netting, in particular for a safety net, in particular according to claim 1, wherein the helix is bent from at least one single wire, a wire bundle, a wire strand, a wire rope and/or another longitudinal element with at least one wire, which in particular comprises a high-tensile steel, in such a way that it comprises at least one first leg, at least one second leg as well as at least one bending region connecting the first leg and the second leg to each other, wherein the longitudinal element is at least substantially bent, without any torsion in itself, along a contour of the first leg and/or of the second leg.

11. The method according to claim 10, wherein the longitudinal element is bent by means of a bending device, which the longitudinal element is supplied to for bending, wherein during supply the longitudinal element is rotated about its longitudinal axis.

12. The method according to claim 11, wherein the longitudinal element passes through a rotating orienting apparatus.

13. The method according to claim 11, wherein the longitudinal element is unwound from a co-rotated reel.

14. The method according to claim 11, wherein by at least one adjustment of a rotation speed of the longitudinal element a torsion of the longitudinal element is compensated during bending by the bending device.

15. The method according to claim 14, wherein, for bending of the bending region, the longitudinal element is rotated at least by a compensating angle, which corresponds to an angle between the first leg and the second leg in a front view perpendicular to a main extension plane of the helix.

* * * * *